United States Patent [19]

Holm

[11] Patent Number: 4,685,526
[45] Date of Patent: Aug. 11, 1987

[54] ARRANGEMENT IN A LOAD CELL

[75] Inventor: Lauri J. Holm, Lidingö, Sweden

[73] Assignee: Systemteknik AB, Lindingö, Sweden

[21] Appl. No.: 796,157

[22] Filed: Nov. 8, 1985

[30] Foreign Application Priority Data

Nov. 23, 1984 [SE] Sweden .................................. 8405931

[51] Int. Cl.$^4$ ........................ G01G 3/14; G01N 15/08
[52] U.S. Cl. ........................................ 177/211; 73/38
[58] Field of Search ............... 177/210 C, 211; 73/38; 29/610 SG

[56]  References Cited

U.S. PATENT DOCUMENTS

| | | | |
|---|---|---|---|
| 3,565,195 | 2/1971 | Miller et al. ..................... | 177/210 C |
| 3,678,378 | 7/1972 | Trott et al. ................. | 177/210 C X |
| 4,266,263 | 5/1981 | Haberl et al. ............... | 177/210 C X |
| 4,520,885 | 6/1985 | Jeffrey ........................... | 177/210 C |

Primary Examiner—George H. Miller, Jr.
Attorney, Agent, or Firm—Shapiro and Shapiro

[57] ABSTRACT

The present invention relates to an arrangement in a load cell comprising a core of resilient material with strain gages mounted on either side of the core and connected to recording instruments or the like. The novel features are that the core consists of a composite, that the strain gages are attached to sheets for their stabilization prior to the mounting thereof on the core, the sheets being of a material bondable to said composite, and that surface layers are likewise of a material bondable to said composite of the core and disposed on the outer sides of the strain gages.

5 Claims, 1 Drawing Figure

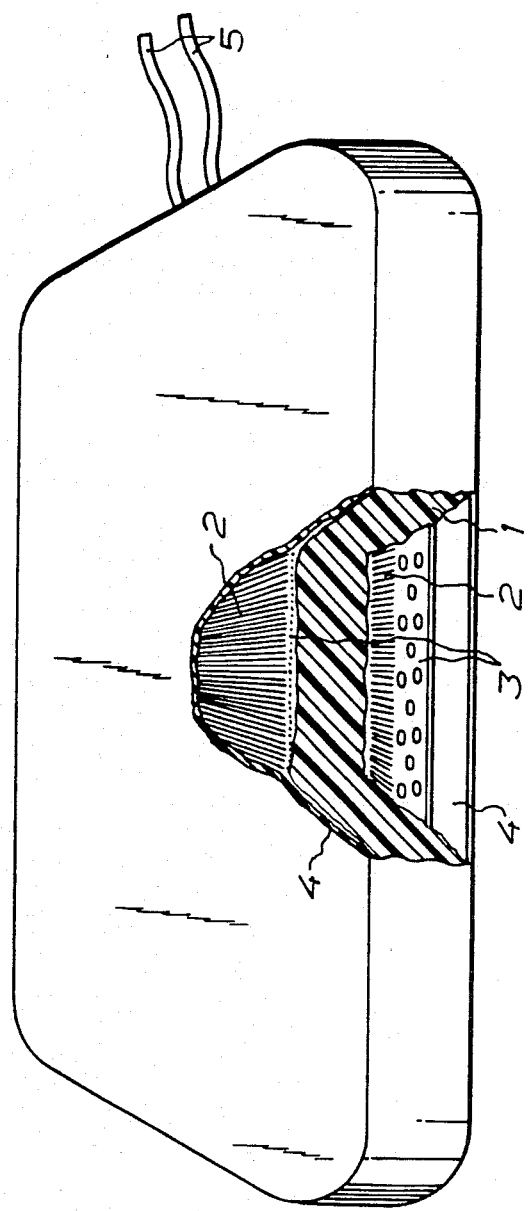

ARRANGEMENT IN A LOAD CELL

The present invention relates to an arrangement in a load cell comprising a core of resilient material with strain gages mounted on either side of the core and connected to recording instruments or the like.

Load cells which are used for various types of devices requiring the sensing a load, such as balances and the like, usually comprise a core plate of steel, aluminum or like material, and strain gages mounted on both sides of the core plate by means of glue or the like. Protective layers of a suitable material can be disposed on the outer sides of the strain gages. The manufacture of prior art load cells is expensive and complicated since the strain gages must be applied manually and with great accuracy. Furthermore, the prior art load cells are sensitive to moisture, and in many cases they cannot, without extraordinary measures being taken, be utilized in instances where they are subject to the risk of being flooded or the like. Furthermore, prior art load cells also must not be used in an explosive environment because of the risk of sparking.

The present invention aims at providing a load cell which can be manufactured in a simple manner and, consequently, at a lower price than conventional cells, which is insensitive to moisture and other external impurities and which is totally explosion-proof.

According to the invention, this is achieved by means of an arrangement in a load cell which is characterized in that the core consists of a composite, that the strain gages are attached to sheets for their stabilization prior to the mounting thereof on the core, said sheets being of a material bondable to the composite, and that surface layers, likewise of a material bondable to the composite of the core, are disposed on the outer sides of said strain gages.

A preferred embodiment of the load cell arrangement according to the present invention will be described in detail below, reference being had to the accompanying drawing which is a perspective view of such a load cell, with parts cut away.

The novel load cell is built up around a core 1 of a plastics composite, preferably nylon and carbon fibers, glass fibers or the like, said core forming the resilient member which is capable of bending under load.

On either side of the core 1, strain gages 2 are mounted, and prior to their mounting on the core they are, in the preferred embodiment, attached to perforated sheets 3. Sheets provided with strain gages can be manufactured mechanically and with extremely high accuracy and can also be handled without any risk of dislocating the strain gages.

The sheets 3 with the strain gages 2 thereon are applied to the core 1 to which thin surface layers 4 of a plastic material capable of bonding to the plastic material of the core 1 are attached. As material for the sheets 3, there is also chosen a material which is capable of bonding to both the core 1 and the surface layers 4. Since the sheets 3 are provided with perforations, the surface layers 4, the sheets 3 and the core 1 will, after being compressed and cured, form a coherent body in which the strain gages 2 are hermetically and firmly enclosed.

Connections 5 of the respective strain gages 2 pass out of the body at convenient points.

An almost homogeneous body is obtained by the use of a core material which has the required resilience and which can be jointlessly connected to the cover layers 4. The embodiment described makes it possible to use, without any problems, the load cell both in a dangerous, corrosive environment and in confined spaces liable to contain explosive mixtures.

It will be appreciated that the invention is not limited to the embodiment described above and illustrated in the drawing, but can be modified in several ways wtihin the scope of the appended claims.

What I claim and desire to secure by Letters Patent is:

1. A load cell comprising a core of resilient plastic material, a pair of perforated sheets mounted on opposite sides of said core and having respective strain gages stably attached thereto, the material of said sheets bonding to the material of said core, and a pair of surface layers respectively placed over said sheets, the material of said surface layers bonding to the material of said core.

2. A load cell according to claim 1, wherein the material of each surface layer bonds to the material of the sheet over which that layer is placed.

3. A load cell according to claim 1, wherein said resilient plastic is a fiber-containing composite.

4. A load cell according to claim 3, wherein said composite includes nylon and carbon fibers.

5. A load cell according to claim 3, wherein said sheets and said surface layers are formed of plastic.

* * * * *